United States Patent [19]
Nakai

[11] Patent Number: 5,701,810
[45] Date of Patent: Dec. 30, 1997

[54] TOFU MAKING APPARATUS

[76] Inventor: Gary T. Nakai, P.O. Box 461,
Madison, Wis. 53701-0461

[21] Appl. No.: 559,421

[22] Filed: Nov. 15, 1995

[51] Int. Cl.$^6$ ............... A23C 3/02; A23J 1/00;
A23L 1/20; A47J 19/00
[52] U.S. Cl. ................. 99/495; 99/453; 99/456;
99/465; 99/483; 100/116; 100/125; 210/346;
210/514
[58] Field of Search ............... 99/452–466, 483,
99/495, 496, 509–513; 210/780, 783, 342–346,
514–518; 100/120, 116, 117, 125

[56] References Cited

U.S. PATENT DOCUMENTS

| | | | |
|---|---|---|---|
| 127,427 | 6/1872 | Potter | 100/125 |
| 127,557 | 6/1872 | Brooke | 100/125 |
| 818,796 | 4/1906 | Spengler | 100/125 |
| 929,717 | 8/1909 | Self | 100/125 |
| 1,535,769 | 4/1925 | Gallardo | 100/125 |
| 1,543,036 | 6/1925 | Taylor | 100/125 |
| 2,139,542 | 12/1938 | Finlayson et al. | 100/125 |
| 2,173,733 | 9/1939 | Seybert | 100/125 |
| 2,362,154 | 11/1944 | Patrick | 100/125 |
| 3,355,805 | 12/1967 | Krueger et al. | 99/458 |
| 3,838,955 | 10/1974 | Dubbeld | 99/458 |
| 4,061,794 | 12/1977 | Charles | 99/458 |
| 4,509,413 | 4/1985 | Granberg et al. | 99/459 X |

OTHER PUBLICATIONS

The Book of Tofu, vol. I, by William Shurtleff & Akiko Aoyagi (1983) pp. 299–306.

*Primary Examiner*—Timothy F. Simone
*Attorney, Agent, or Firm*—Juettner Pyle Lloyd & Piontek

[57] ABSTRACT

The apparatus of the invention comprises three stages. The first stage extracts soy milk from soybean go, and comprises a cylindrical pot, a cylindrical filter for receiving go held within the pot, there being an annular gap between the filter and the pot, a wire cloth disk movable within the filter, the disk having a circumferential seal for sealing between the edges of the disk and the sides of the filter, and a press assembly for urging the disk downwardly within the filter, whereby soy milk is extracted from the go, passes through the filter and into the annular gap. The soy milk is cooked in the pot. A solidifier is added while a second stage of the apparatus of the invention creates a gentle turbulence within the soy milk. After the soybean curds are formed, the third stage of the invention compresses the curds into tofu. The third stage comprises a form having openings for escape of whey which fits within the pot. The press assembly is used to urge the form downwardly within the pot to compress the tofu curds and remove the whey. The single pot replaces prior art cauldron, curding barrel and settling box. Ladling of tofu curds from a curding barrel to a settling box is eliminated.

25 Claims, 4 Drawing Sheets

TOFU MAKING APPARATUS

BACKGROUND OF THE INVENTION

The present invention relates to housewares and kitchen appliances for both domestic and commercial applications, and particularly home tofu making methods and apparatus.

Health conscious consumers continually seek ways to improve their eating habits. Tofu (soybean curd) is an appealing high quality protein alternative, as evidenced by its growing availability in supermarkets. Commercial varieties cannot emulate the taste and texture of fresh homemade tofu, however. Traditionally, making tofu in the home has been cumbersome, involving the use of special utensils and complicated procedures not practical for the novice or in limited kitchen spaces.

*The Book of Tofu* by William Shurtleff & Akiko Aoyagi, Ten Speed Press, Berkeley, Calif. (1975) discloses in depth the history of tofu, the practice of making tofu, tofu recipes, etcetera. Reference is made to *The Book of Tofu* for a complete description of the state of the art.

A traditional method of making tofu includes the following steps:

1. 13.25 quarts of soybeans are washed with water in a barrel, and then are soaked in 12 gallons of fresh water overnight.

2. The water is drained from the soaked soybeans and is fed into a grinder along with fresh water. The tofu is ground with water forming "go."

3. 21 gallons a water is poured into an iron cauldron and brought to a boil.

4. The go is added to the boiling water and cooked over high heat. The mixture is brought to a boil and stirred down three times, and then simmered for about five minutes.

5. Soy milk is then extracted from the cooked go. This is accomplished by lining a barrel with a straining bag and placing a pressing sack within the lined barrel. The cooked go is ladled into the sack. Soy milk is allowed to drain from the sack into the barrel. The sack is then placed in a mechanical press above the barrel and pressed to cause additional soy milk to drain from the sack into the barrel. "Okara" remains in the sack. The straining bag is then removed from the barrel, allowing the soy milk to filter through the bag into the barrel. Some fine grained okara is retained in the straining bag.

6. The okara may then be added into 9.5 gallons of fresh water in the cauldron, and the soy milk extraction step is repeated.

7. 4.5 cups of nigari solution (a solidifier) is mixed with 3 gallons of warm water. The nigari is slowly stirred into the soy milk. The soy milk is allowed to sit for about twenty minutes as curds form.

8. Excess whey is removed from the barrel by placing a bamboo colander covered with a cloth into the barrel. The colander has a circular disk shape that conforms to the diameter of the barrel. The colander is pressed downwardly (e.g., by placing a stone on the colander) causing whey to pass upwardly through the colander. The whey is then ladled off.

9. The curds are then transferred to settling boxes. A settling box is a rectangular wooden box with holes in its sides and bottoms. The boxes are lined with cloth. The curds are ladled from the barrel and placed in the boxes. The cloth is folded over the top of the curds. A bamboo mat is placed on top. And, a wooded pressing lid set on top of the mat. Weights are added to the pressing lid, first a five pound weight, and later a twenty-five pound weight. The curds are pressed for 15 to 20 minutes, until whey no longer drips from the holes in the settling boxes.

10. The settling boxes are inverted within a water filled sink to remove the cloth wrapped tofu cakes. The cakes are unwrapped and cut to desired size while emersed underwater.

The quality of the tofu made by the forgoing method is excellent. Other methods of making tofu vary somewhat from the above traditional method. But, as one may readily appreciate from the foregoing recitation, such prior art processes are a difficult and time-consuming task if done in the home.

Furthermore, the tofu making must invest in a considerable amount of equipment, some of which have somewhat redundant functions. It is customary in art to press the go externally off the curdling barrel. The pressing device used for pressing the go is different from the pressing device used in pressing the soybean curds into tofu cakes. Thus, the art traditionally employs several pieces of equipment for similar tasks.

Traditionally, the soybean curds are ladled from the curding barrel into the settling boxes. A drawback is that such handling of the curds upsets their physical structure that then requires the curds to be press formed together to the degree that results in firmer, less succulent tofu for the same amount of handling durability. The tradeoff between soft and succulent versus durability has traditionally resulted in untasty hard tofu or unduly fragile tofu.

For the foregoing reasons, there is a need in the art for a scaleable (i.e., can be made in various capacities) tofu maker that will swiftly and easily produce a sufficient quantity of high quality tofu for appropriately sized batch production.

OBJECTS OF THE INVENTION

It is an object of the invention to provide a tofu making method and apparatus that will produce high quality tofu, i.e., tofu that is soft, succulent, and durable to handling.

It is an object of the invention to provide a tofu making method and apparatus that is scaleable to produce an appropriate quantity of tofu, i.e., one that will produce an appropriate quantity of tofu for family consumption, or which may be scaled up for commercial production.

It is another object of the invention to provide a tofu making method and apparatus that will swiftly, easily and conveniently make tofu.

It is yet another object of the invention to provide a tofu making apparatus that is readily and inexpensively manufactured, distributed and sold.

SUMMARY OF THE INVENTION

In fulfillment of the objects of the invention, a tofu making apparatus and method is herein disclosed that is particularly well suited for home use. Although it is an object of the invention to provide a home tofu maker, the apparatus and method of the invention have applicability to commercial tofu manufacture, and the invention should not be construed as limited to home use.

To make tofu, one starts by soaking soybeans overnight. The soaked beans are then ground with water in a mill or blender to form go. The next step is to extract soy milk from the go. This function is performed with use of the first stage of the apparatus of the invention.

In a first stage, the apparatus of the invention comprises a pot, the pot having a bottom and substantially cylindrical side walls, a cylindrical filter insertable into and removable from the pot, the filter having sides with a diameter smaller than that of the pot so as to form an annular gap between the sides of the filter and the side walls of the pot when the filter is in the pot, a wire cloth disk movable within the filter, the disk having a circumferential seal for sealing between the edges of the disk and the sides of the filter, and a press assembly for urging the disk downwardly within the filter. The press assembly comprises a base, a frame engagable with the base, the frame having a pair of spaced apart uprights extending upwardly from the base, a bridge attachable to and removable from the frame, the bridge bridging the span between the uprights, a screw mechanism slidably held by the bridge, a press plate attached to a lower end of the screw mechanism for engaging the wire cloth disk, and a handle secured to an upper end of the screw mechanism. Preferably, a funnel is attached to the top of the filter. The press plate has openings therein to allow soy milk to pass therethrough.

The soybean go is poured into the filter. Hot tap water is then poured into the filter while the go is stirred. This will cause soy milk to migrate out of the filter and into the annular space between the filter and the pot. Next, the wire cloth disk and seal are secured to the press plate and the disk and press plate are inserted into the filter and connected to the press assembly. By sliding the screw mechanism in the bridge, the disk may be pressed down on top of the go. By turning the handle, the press assembly urges the disk downwardly within the filter forcing additional soy milk to exit the filter. Once, the soybean go is sufficiently compressed, the filter and press assembly are removed from the pot. The extracted soy milk remains in the pot. The filter retains okara—the solid residue of the go. The okara may be saved as it is a nutritious food enhancer.

The next step is place the pot containing the soy milk on a stove. The soy milk is brought to a boil, stirring occasionally. Once brought to a boil the heat may be reduced, and the soy milk is simmered for about seven minutes.

The next step in the process is to add a solidifier ("nigari"), dissolved in water, to the soy milk. The solidifier may be selected from a number of known salts, e.g., calcium chloride, calcium sulfate, magnesium chloride, magnesium sulfate, natural bitters or epsom salts. A second stage of the apparatus of the invention is assembled. The press assembly is reassembled, but the filter, disk and seal, and press plate are removed and a rod is added to the bridge and pressed against the base plate to hold the base plate to the frame. The reassembled apparatus is slowly inserted back into the pot. Simultaneously, the solidifier solution is added to the soy milk. The slow insertion of the press assembly, including the base, causes a gentle turbulence in the soy milk, mixing the solidifier ideally throughout the milk. The rod and bridge are then removed, but the base and frame are left in place. The soy milk should then be left for five minutes for soybean curds to fully form.

After the soybean curds are formed, the next step is to compress the curds into tofu, while removing the soybean whey. A third stage of the apparatus of the invention is used to accomplish the curd compressing function. A form is inserted into the pot on top of the tofu curds. The form has openings therein to allow the escape of soybean whey. The press assembly, with bridge and press plate, is reinstalled. The press plate is brought downwardly into contact with the form. First pressing down by hand and then by rotating the handle causes the screw mechanism to urge the form downwardly within the pot. The openings in the plate comprise an outlet to allow whey to escape, but not the soybean curds. A stop cock or other venting means could be placed in the side walls or the bottom of the pot to provide an alternate outlet for the whey. The curds are compressed between the base and form thereby molding a cake of tofu. Once the desired compression is achieved, the whey may be poured off and replaced with cool water. After the tofu has cooled and the cool water poured off, the press assembly may be removed from the pot and disassembled. The tofu cake should be separated from the form with a sharp, thin bladed knife. Using the base as a cutting board, the tofu mass can then be cut as desired, and served or stored.

The entire process takes about forty-five minutes, is easily accomplished, and produces suitable quantity of superior tasting tofu. The soybean go is pressed within the curding pot, not outside the pot as with traditional methods. Significantly, there is no need to ladle tofu curds from a curding barrel to a settling box, where such handling breaks up the naturally formed curd mass. In the present invention the undisturbed mass is pressed within the curding pot. Tofu formed from such undisturbed curds is soft and succulent yet more durable in handling. The one pot of the present invention replaces the cauldron, curding barrel and settling box traditionally used in making tofu. The one press assembly replaces the traditional press and static weights that are placed over the settling boxes. Further objects and advantages of the invention will become apparent from the following detailed description when read in conjunction with the accompanying drawings.

DETAILED DESCRIPTION

Figure 2:
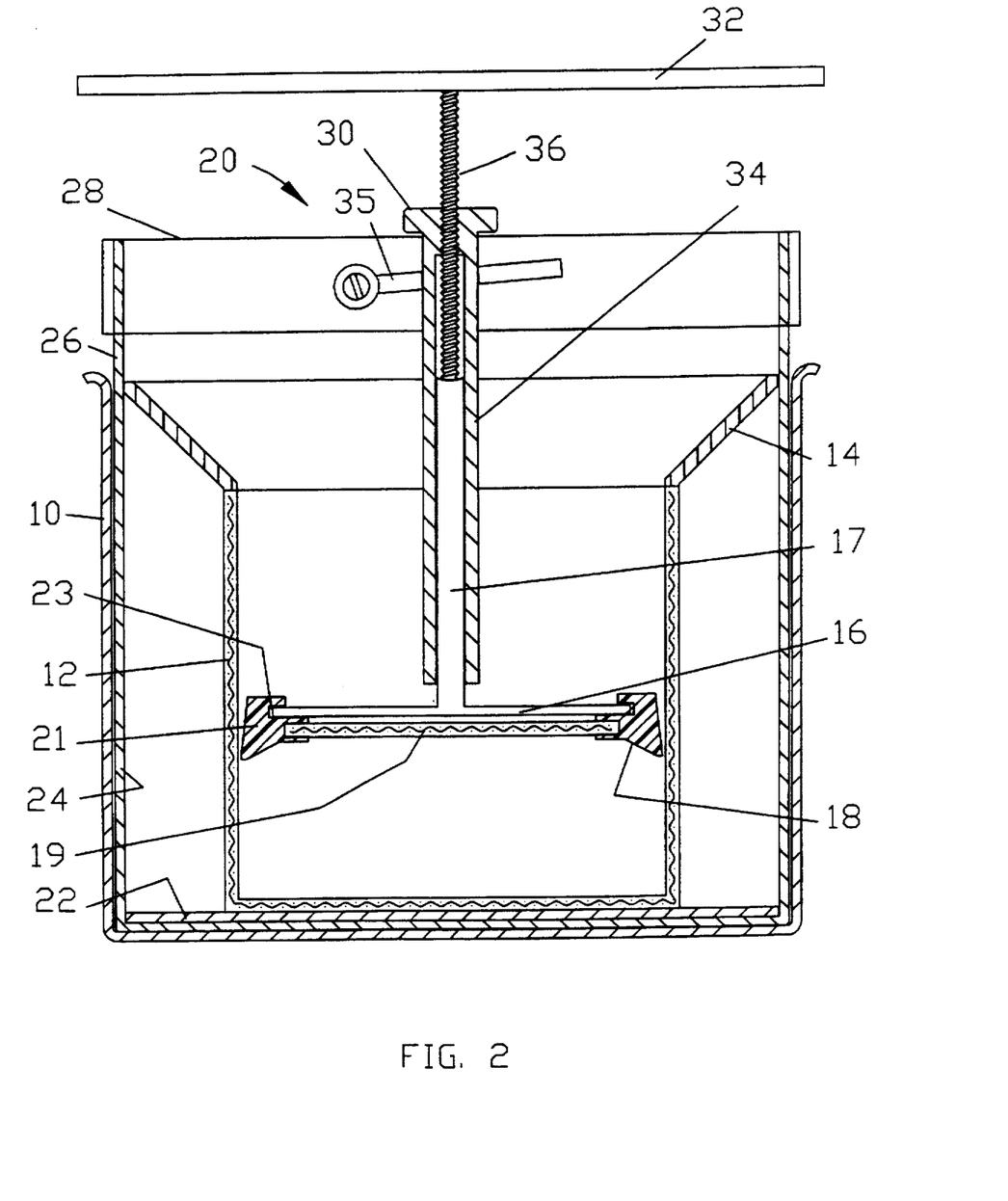
FIG. 2 is cross sectional view of the first stage of the apparatus of the invention taken along line 2—2 of FIG. 1.
Figure 3:
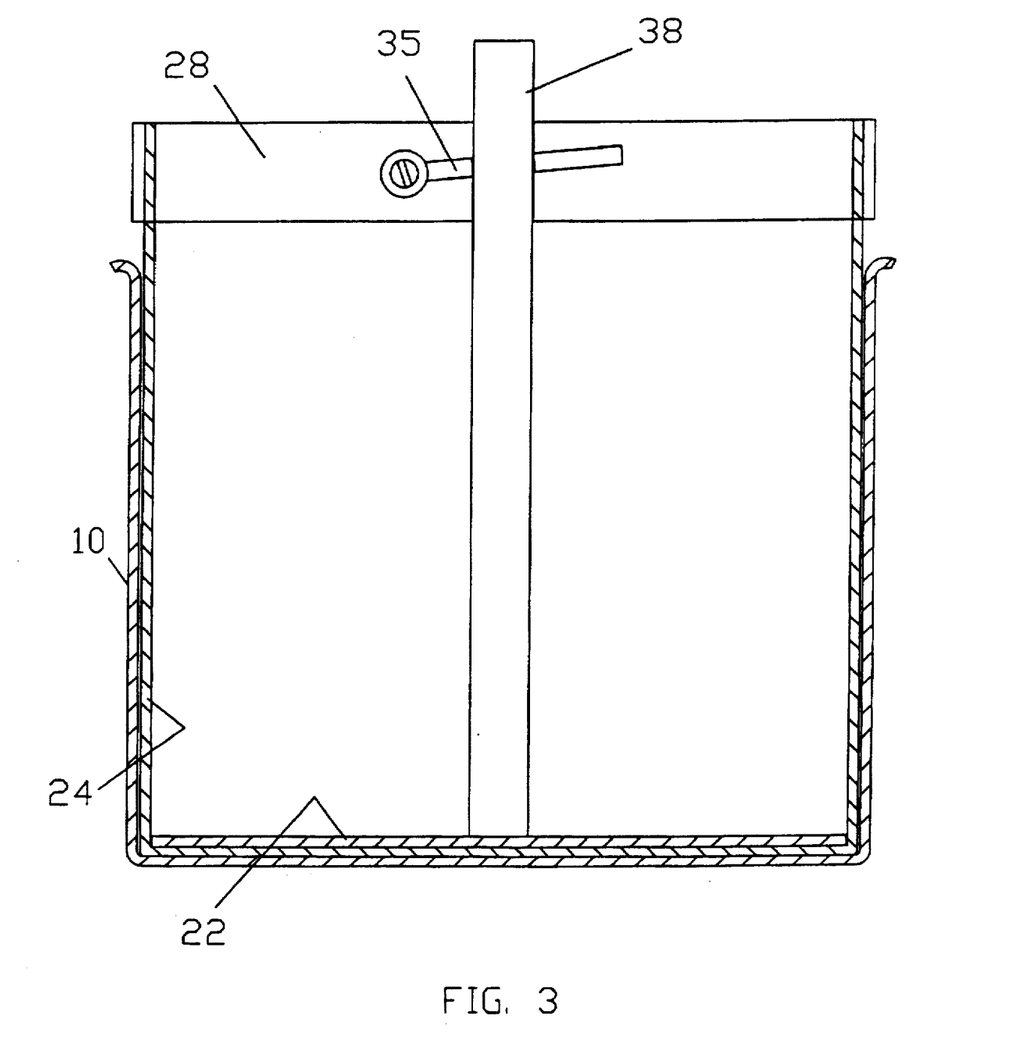
FIG. 3 is cross sectional view similar to that of FIG. 2, but illustrating a second stage of the apparatus of the invention.
Figure 4:
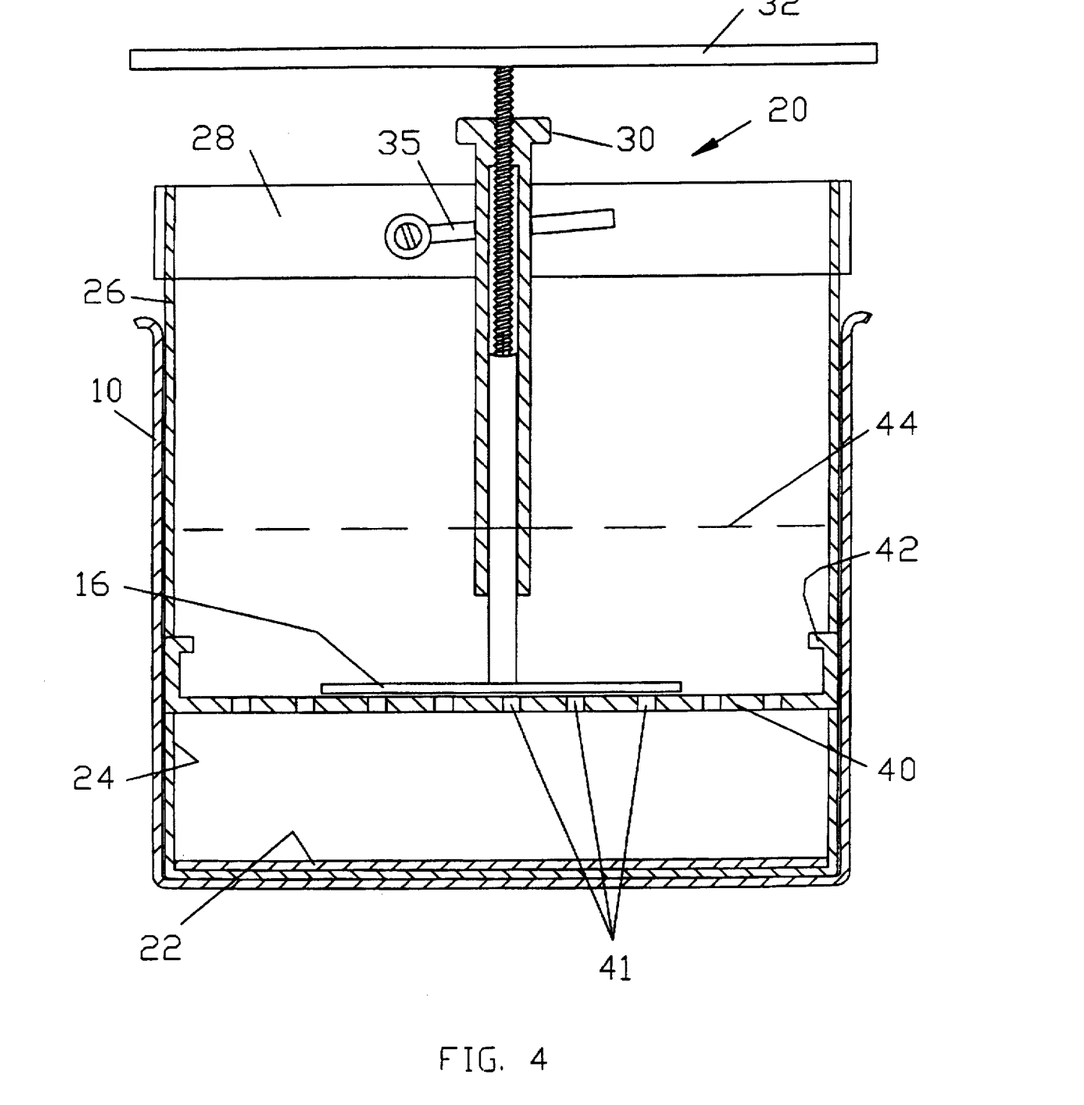
FIG. 4 is cross sectional view similar to that of FIG. 2, but illustrating a third stage of the apparatus of the invention.

Turning now to the drawings, the apparatus of the invention comprises three stages, which are best illustrated in FIGS. 2, 3 and 4, respectively. The first stage comprises a pot 10, filter 12, wire cloth disk 19 with seal 18, and press assembly 20. The filter 12 preferably includes a funnel 14 attached to the top of the filter. The press assembly 20 comprises a base plate 22, a frame 24, bridge 28, press plate 16, and screw mechanism 30. The seal 18 releasable attaches the disk 19 to the press plate 16. The screw mechanism comprises a tube 34 having an internal thread, a threaded rod 36, and handle 32. The tube 34 is slidably held by the bridge 28. The threaded rod 36 passes through the tube 34. The handle 32 is secured to the top of rod 36. The press plate 16 desirably includes a stem 17 that is slidably received with tube 34. The bottom of threaded rode 36 engages the top of stem 17. Accordingly, rotation of the handle 32 in a clockwise direction causes the press plate 16, seal 18 and disk 19 to move downwardly towards the base 22.

Pot 10 is a cylindrical metal container or enclosure. It is desirable to select a pot that has a draft angle (i.e., the top has a slightly larger diameter relative to the bottom) and a small radius at its bottom inner corner. The pot preferably has a capacity of about 7.5 liters.

Filter 12 may be fabricated from 100 mesh SST304 stainless steel wire cloth. The diameter of the filter is less than that of the pot 10 so as to form an annular gap between the pot and the filter. A funnel 14 is attached to the top of the filter. The funnel may be fabricated from anodized aluminum and secured to the filter by known techniques. The size of the mesh may be enlarged or reduced depending on one's taste for the finished tofu product. A larger mesh will produce a coarser texture in the tofu.

Figure 1:
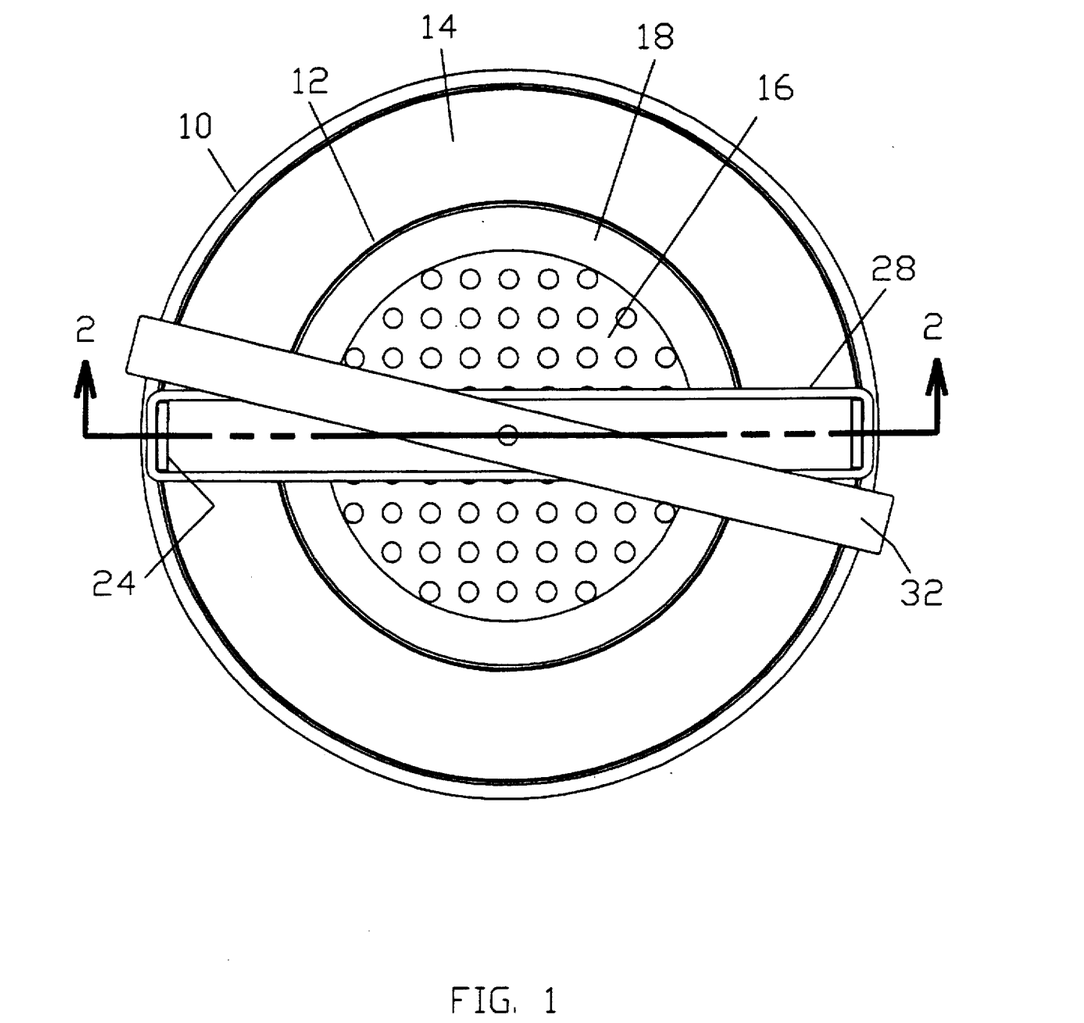
FIG. 1 is a top plan view of a first stage of the apparatus of the invention.

Press plate 16 may be fabricated from anodized aluminum plate. It must be sufficiently strong to maintain rigidity when the soybean go is compressed. The press plate has a diameter slightly smaller than that of the filter 12. The plate 16 is punched with a multiplicity of holes, or may be seen in FIG. 1.

The disk 19 is 40 mesh SST304 stainless steel wire cloth 19 integrally molded to a circumferential silicone rubber seal 18. The seal 18 prevents migration of go past the disk and press plate. The upper portion of seal 18 has a recess 23 for receiving the edges of the press plate 16.

The base 22 may be fabricated from anodized aluminum plate. The base should have a thickness equal to or greater than the radius at the bottom edge of the pot, so that the top of the base forms a right angle edge to the side walls of the pot. The bottom of the base should conform to the bottom of the pot so that it fits neatly into the bottom of the pot. Because of the draft angle of the pot 10, the diameter of the base is slightly smaller than the inner diameter of the top portion of the pot so that it may be readily inserted and removed from the pot and so that a turbulence in the soy milk will be generated when the base is inserted into the pot. If the selected pot does not have a draft angle, than the base should be made with a diameter slightly smaller than that of the pot to provide a small annular gap between the side wall and the base to allow soy milk to flow there-through. The bottom of the base 10 includes a wide groove and the side edges are notched to receive the frame 12.

The frame 12 may be fabricated from anodized aluminum plate. The frame includes uprights 26, which are parallel to the pot side walls and extend vertically above the top of the pot 10.

The bridge 28 is removably attached by any conventional means to the upper portions of the frame 26 and bridges the span between the uprights 26. The bridge holds the screw mechanism 30. Preferably, the bridge includes a gripping mechanism 35 to allow the user to manually slide the screw mechanism down without turning the handle. Once the press plate is moved to a desired position, than the screw mechanism can be used to mechanically urge the press plate downwardly. The bridge may be fabricated from anodized aluminum.

The screw mechanism has an internal threaded portion of tube 34 that receives the threaded rod 36. The tube is held to the bridge via a gripping mechanism 35. The gripping mechanism 35 allows downward relative movement of the tube 34 with respect to the bridge 28, but does not allow upward motion. As handle 32 is initially pressed downward so is the threaded rod 36 and tube 34. The mechanism 35 grips the tube as the handle is rotated, allowing further pressing at a higher axial force. Upward movement to withdraw the tube 34 is accomplished by releasing the gripping mechanism. Any suitable releasable gripping mechanism may be employed.

FIG. 3 illustrates a second stage of the apparatus of the invention. The pot 10, base 22, frame 24 and bridge 28 are the same as that shown in FIG. 1. The filter 12, press plate 16 and screw mechanism 30 have been removed, however. A rod 38 is slidably held by bridge 28. The rod 38 is pushed against the base 22 to hold it against frame 24. Thus, the base will not fall off when the second stage press assembly is inserted into the pot when full of soy milk.

FIG. 4 illustrates the third stage of the apparatus of the invention. As with the second stage, the pot 10, base 22, frame 24 and bridge 28 have been retained. The rod 38 has been removed. A form 40 has been added. The press plate 16 and screw mechanism 30 have been restored.

The form 40 is preferably stamped from stainless steel sheet. The form contains a multiplicity of holes 41 throughout its surface to permit soybean whey below the form to pass through the form as it is lowered. The holes should have a diameter of about 3.2 mm. The form 40 preferably has handles 42. The form has a diameter closely matching but smaller than the internal diameter of the pot. Two side edges of the form are notched to receive the uprights 26. Rotation of handle 32 in a clockwise direction causes the screw mechanism 30 to force the press plate 16 downwardly onto form 40, and move the same from the position shown at dashed line 44 to the position of the form 40 shown in solid lines.

A preferred method of making tofu is as follows:

1. Soak two cups of soybeans overnight.

2. Grind the pre-soaked soybeans with five cups water into a smooth and white go.

3. Install the frame 24, base 22 and filter 12 in the pot 10.

4. Pour the go into the filter.

5. While stirring the go, pour about fifteen cups of hot tap water (38–55 degrees centigrade) into the filter.

6. Install the seal 18 on the press plate 16, and insert the press plate into the filter 12.

7. Install the screw mechanism 30 and bridge 28. Press downwardly on the handle 32 to move tube 34 into contact with press plate 16 and further to move the press plate into contact with the go.

8. Rotate the handle 32 to urge the press plate 16 downwardly through the filter 12, extracting soy milk from the filter.

9. Remove the press assembly 20 and filter 12 from the pot, leaving only the soy milk in pot 10.

10. Place the pot 10 on a stove and cook the soy milk, stirring occasionally. When the milk reaches boil and begins to foam, reduce the heat and simmer for about seven minutes.

11. Assemble stage two of the press assembly 20 outside of the pot 10. Specifically, assemble the frame 24, base 22, bridge 28 and rod 38.

12. Mix a solidifier with one cup of water.

13. Insert the stage two press assembly into the pot while simultaneously adding the solidifier solution to the soy milk swirling above the descending base.

14. Remove the bridge 28 and rod 38. Let the soy milk stand for about five minutes to allow soybean curds to fully form.

15. Install stage three of the press assembly 20. Specifically, insert the form 40 into the pot, and assemble the press plate 16, screw mechanism 30 and bridge 28.

16. First by pressing downwardly on the handle 32 press the form 40 toward the base to extract the whey. Pour off the whey and let drain for a moment.

17. Set the pot in an upright position and by turning the handle advance the screw mechanism to extract additional whey and compress the soybean curds together into a tofu cake between the base 22 and the form 40. Pour off the last remaining whey.

18. Fill the pot with cool water and let stand for about eight to ten minutes, to allow the tofu cake to cool.

19. Drain the cool water from the pot. Remove the stage three press assembly 20 from the pot 10, with the tofu cake still remaining between the form and base.

20. Disassemble the press assembly 20.

21. With a sharp, flat bladed knife, separate the form from the top of the tofu cake. Alternatively, one may twist the form to separate it from the tofu cake.

22. Slice the tofu cake into desired pieces, i.e., bite size cubes.

23. Serve or chill the tofu. Extra tofu should be kept emersed in water and refrigerated.

The objects and advantages of the invention have thus been shown to be attained in a convenient, economical and facile manner. While the preferred embodiment of the apparatus and method of the invention have been shown and described, it is to be understood that various modifications and changes may be made thereto without departing from the scope of the invention as defined by the appended claims.

What is claimed is:

1. An apparatus for extracting soy milk from soybean go, comprising:

an enclosure having side walls;

a filter insertable into and removable from said enclosure, said filter having sides with a dimension smaller than an inner dimension of the side walls of said enclosure to form a gap between the sides of said filter and the side walls of said enclosure when said filter is inserted into said enclosure, said filter for receiving the soybean go;

a pressing member extending between the sides of said filter and movable within said filter; and an elastomeric seal between said pressing member and said filter.

2. The apparatus as in claim 1, wherein said enclosure and said filter are cylindrical, said filter having a diameter smaller than said enclosure, whereby said gap comprises an annular gap between said filter and said enclosure.

3. The apparatus as in claim 1, wherein said pressing member comprises wire cloth having openings to allow the escape of soy milk.

4. The apparatus as in claim 3, wherein said elastomeric seal is molded to said pressing member, said seal for sealing engaging the sides of said filter.

5. The apparatus as in claim 1, further comprising press means for forcing soy milk from said enclosure, wherein said press means comprises:

a bridge extending over said filter; and a screw means held by said bridge and engaging said pressing member.

6. The apparatus as in claim 5, said screw means comprising:

a tube slidably held by said bridge, said tube having an internal thread;

a threaded rod engaged with said tube, said rod extending downwardly to engage said press plate; and a handle secured to the upper end of said rod for rotating said rod.

7. The apparatus as in claim 1, further comprising a funnel, said funnel having a small end attached to the top of said filter and a large end conforming to the side walls of said enclosure when said filter is placed within said enclosure.

8. The apparatus as in claim 1, for compressing soybean curds and extracting soybean whey, further comprising:

a base extending between the side walls of said enclosure, said base being removable from said enclosure;

a form insertable into and removable from said enclosure, said form conforming to the side walls of said enclosure, and said form being parallel to said base;

means for moving said form toward said base; and outlet means in one or more of said enclosure, base or form for allowing the escape of soybean whey when said form is moved towards said base.

9. The apparatus as in claim 8, wherein said form moving means, alternatively, engages said pressing member to move said pressing member downwardly within said filter or engages said form to move said form towards said base.

10. The apparatus as in claim 8, wherein said outlet means comprises a multiplicity of openings in said form.

11. An apparatus for extracting soybean milk from soybean go, utilizing a pot, the pot having a bottom and cylindrical side walls, comprising:

a filter insertable into and removable from the pot, said filter having a smaller diameter than the pot to form an annular gap between the sides of said filter and the side walls of the pot when said filter is inserted into the pot, said filter for receiving the soybean go;

a circular pressing member received and movable within said filter;

an elastomeric seal held between said filter and said pressing member; and press means for moving said pressing member downwardly in said filter, whereby soy milk is forced through said filter into said annular gap.

12. The apparatus as in claim 11, for compressing soybean curds and extracting soybean whey, further comprising:

a base extending between and conforming to the side walls of the pot, said base being removable from the pot;

a form insertable into and removable from the pot, said form extending between and conforming to the side walls of the pot, and said form being parallel to said base;

outlet means in one or more of the pot, said base or said form for allowing the escape of soybean whey when said form is moved towards said base; and said press means, alternatively, engaging said pressing member to move said pressing member downwardly within said filter or engaging said form to move said form towards said base.

13. An apparatus for making tofu, comprising:

a pot having side walls;

a filter insertable into and removable from said pot, said filter having sides with a dimension smaller than an inner dimension of said pot to form a gap between the sides of said filter and the side walls of said pot when said filter is inserted into said pot;

a pressing member insertable into, removable from and movable within said filter;

a form insertable into, removable from and movable within said pot, said form extending between and conforming to the side walls of said pot, said form having openings therein to allow the escape of soybean whey; and press means for, alternatively, moving said pressing member downwardly through said filter, or moving said form downwardly within said pot.

14. The apparatus as in claim 13, wherein said press means comprises:

a base insertable into and removable from said pot, said base conforming to the side walls of said pot;

a bridge extending over said pot; and screw means held by said bridge and extending downwardly to engage said pressing member or said form.

15. An apparatus for making tofu from a mixture of soybean curds and whey, comprising:

side walls forming an enclosure;

a flat, rigid base extending between and conforming to said side walls of said enclosure, said base being separate and removable from the side walls of said enclosure;

a form insertable into, removable from and movable within said enclosure, said form extending between and conforming to said side walls, and said form being parallel to said base, said side walls, base and form defining a volume within which the mixture of soybean curds and whey are received;

press means for moving said form towards said base; and outlet means in one or more of said side walls, base or form for allowing the escape of soybean whey when said form is moved towards said base.

16. The apparatus as in claim 15, wherein said enclosure has a bottom wall integral with said side walls, and said base is insertable into said enclosure juxtaposed to the bottom wall of said enclosure.

17. The apparatus as in claim 15, wherein said enclosure is cylindrical, and said base and said form are circular.

18. The apparatus as in claim 15, wherein said outlet means comprises a multiplicity of openings in said form.

19. The apparatus as in claim 15, further comprising a filter insertable into said enclosure, said filter having sides with a dimension smaller than an inner dimension of said side walls of said enclosure to form a gap between the said filter and said side walls of said enclosure when said filter is inserted into said enclosure; and a pressing member insertable in, removable from and movable within said filter, said pressing member sealing engaging said filter.

20. The apparatus as in claim 19, further comprising a funnel, said funnel having a small end attached to the top said filter and a large end conforming to said side walls of said enclosure.

21. The apparatus as in claim 19, further comprising an elastomeric seal held between said filter and said pressing member for said sealing engaging said filter.

22. The apparatus as in claim 19, wherein said press means comprises:

a bridge extending over said enclosure; and a screw means held by said bridge and engaging said form.

23. An apparatus for making tofu, comprising:

a pot having cylindrical side walls for cooking soy milk, curdling soybean curds, and for settling soybean curds;

a circular base insertable into and removable from said pot, said base having a diameter substantially the same as but smaller than said pot;

a cylindrical filter insertable into and removable from said pot, said filter having sides with a diameter smaller than the pot to form an annular gap between the sides of said filter and the side walls of said pot when said filter is inserted into said pot;

a funnel, said funnel having a small end attached to the top of said filter and a large end having a diameter substantially the same as said pot;

a circular disk insertable into, removable from and movable within said filter, said disk having openings therein to allow soy milk to pass therethrough;

an elastomeric seal molded to a circumferential edge of said disk for sealing between said disk and the sides of said filter;

a form insertable into and removable from the pot, said form having a diameter substantially the same as but smaller than said pot;

a frame attached to said base, said frame having a pair of spaced apart uprights extending upwardly from said base;

a bridge attachable to and removable from said frame, said bridge bridging the span between said uprights;

a press plate engagable, alternatively, with either said disk or said form; and a screw means held by said bridge and engaging said press plate, said screw means including a handle, whereby rotation of said handle causes said screw means to extend downwardly for, alternatively, moving said disk downwardly through said filter or moving said form downwardly towards said base.

24. An apparatus for making tofu from a mixture of soybean curds and whey, comprising:

a pot having side walls and a bottom;

a base insertable into said pot when the same contains hot soybean milk, said base having a dimension smaller than said side walls whereby a turbulence in the soy milk is caused when the base is inserted into said pot; and a rod held to said base to facilitate insertion of said base into said pot.

25. The apparatus as in claim 24, further comprising a form insertable into, removable from and movable within said pot, said form extending between and conforming to the side walls of said pot, and said form being parallel to said base, said pot side walls, base and form defining a volume within which the mixture of soybean curds and whey are received, said form having openings therein to allow for the escape of whey.

* * * * *

UNITED STATES PATENT AND TRADEMARK OFFICE
CERTIFICATE OF CORRECTION

PATENT NO. : 5,701,810
DATED : December 30, 1997
INVENTOR(S) : Gary T. Nakai

It is certified that error appears in the above-identified patent and that said Letters Patent is hereby corrected as shown below:

Column 7, line 62, cancel "press plate" insert -- pressing member --

Signed and Sealed this

Ninth Day of May, 2000

Attest:

Q. TODD DICKINSON

Attesting Officer

Director of Patents and Trademarks